United States Patent
Kucher et al.

(10) Patent No.: US 7,252,235 B2
(45) Date of Patent: Aug. 7, 2007

(54) BARCODE FORMED ON A MATERIAL

(75) Inventors: Trent Steven Kucher, Peoria, IL (US);
Justin L. Koch, Deer Creek, IL (US)

(73) Assignee: Caterpillar Inc., Peoria, IL (US)

( * ) Notice: Subject to any disclaimer, the term of this patent is extended or adjusted under 35 U.S.C. 154(b) by 206 days.

(21) Appl. No.: 11/012,162

(22) Filed: Dec. 16, 2004

(65) Prior Publication Data

US 2006/0131417 A1    Jun. 22, 2006

(51) Int. Cl.
*G06K 7/10* (2006.01)

(52) U.S. Cl. .................. 235/462.16; 235/462.09

(58) Field of Classification Search ........... 235/462.16, 235/462.01, 462.09
See application file for complete search history.

(56) References Cited

U.S. PATENT DOCUMENTS

| | | | |
|---|---|---|---|
| 4,533,815 A | 8/1985 | Ecer | |
| 4,822,987 A | 4/1989 | Goldenfield et al. | |
| 4,824,266 A * | 4/1989 | Fujii et al. | 358/1.11 |
| 4,901,073 A | 2/1990 | Kibrick | |
| 5,023,437 A | 6/1991 | Speicher | |
| 5,175,425 A | 12/1992 | Spratte et al. | |
| 5,329,090 A | 7/1994 | Woelki et al. | |
| 5,463,200 A | 10/1995 | James et al. | |
| 5,632,916 A | 5/1997 | Lappalainen et al. | |
| 5,856,648 A | 1/1999 | Frauchiger et al. | |
| 5,894,348 A | 4/1999 | Bacchi et al. | |
| 5,907,144 A | 5/1999 | Poon et al. | |
| 5,984,193 A * | 11/1999 | Uhling | 235/494 |
| 6,068,966 A | 5/2000 | Koga | |
| 6,146,030 A * | 11/2000 | Ackley | 400/103 |
| 6,147,342 A | 11/2000 | Kucher | |
| 6,327,791 B1 | 12/2001 | Norcross et al. | |
| 6,527,193 B1 | 3/2003 | Béli et al. | |
| 6,774,340 B1 | 8/2004 | Chiba et al. | |
| 2002/0000471 A1 | 1/2002 | Aasmul et al | |

* cited by examiner

*Primary Examiner*—Daniel StCyr
(74) *Attorney, Agent, or Firm*—Finnegan, Henderson, Farabow, Garrett & Dunner

(57) ABSTRACT

A barcode on a material includes at least one line having a length and a width. The line may be formed by markings on the material, and the markings may form a first row and a second row. The first row may be adjacent to the second row. The markings also forming a first column and a second column, with the first column being adjacent to the second column. The markings of the first row are offset from the markings of the second row.

23 Claims, 3 Drawing Sheets

BARCODE FORMED ON A MATERIAL

TECHNICAL FIELD

This application is directed to a barcode formed on a material and more particularly, to a barcode formed on the material using a laser.

BACKGROUND

Many construction and earth moving machines use hydraulic or pneumatic cylinders to move a work tool such as a bucket on a backhoe, a loader, or an excavator. The cylinder may include a cylinder rod coupled at one end to the work tool with a cylinder body having a chamber formed therein at the other end. Hydraulic fluid may be introduced into the chamber to extend the rod from the body and may also be removed from the chamber to retract the rod. Often, the rod position or the amount of the extension of the rod must be known so that movement of the work tool can be controlled or monitored.

Barcodes have been marked on cylinder rods in order to locate the position of the rod. In particular, the rod may be marked with a barcode including non-repeating segments of code, each of which correspond to a different location of the rod. In operation, a sensor is provided in the cylinder adjacent the barcode to identify a particular segment which is then associated with a corresponding rod location.

In some systems, the barcode is formed on the cylinder rod using a laser system. In these systems, the laser may heat a designated portion of the cylinder rod to anneal the surface, changing the color of the rod, thereby forming the lines of the barcode. However, such annealing may melt and redeposit a certain amount of material. In some instances, the laser energy is sufficient to remove the material through ablation, or alternatively, create plasmas capable of removing material. This results in an added surface roughness of the cylinder rod in the form of peaks and valleys, perpendicular to the direction the laser travels when marking. This added roughness may wear other materials that travel along the marked surface, such as sealing materials. Further, to get a good contrasting mark, it is often necessary to repeatedly expose the rod surface to the laser, thereby compounding the formation of peaks and valleys.

One system for forming a barcode on a surface is disclosed in U.S. Pat. No. 5,023,437 to Speicher. The '437 patent discloses creation of a barcode on a surface using individual imprinted marks to form a plurality of substantially linear rectangular arrays. The arrays are formed of a plurality of laser marks disposed adjacent each other in aligned rows and columns. However, spaces between the laser marks may be interpreted by a scanning reader to be empty bars of the barcode.

The present invention is directed to overcoming one or more of the problems in the prior art.

SUMMARY OF THE INVENTION

In one exemplary aspect, this disclosure is directed toward a barcode on a material. The barcode includes at least one line including a length and a width. The line may be formed by markings on the material, and the markings may form a first row and a second row. The first row may be adjacent to the second row. The markings also may form a first column and a second column, with the first column being adjacent to the second column. The markings of the first row are offset from the markings of the second row.

In another exemplary aspect, this disclosure is directed to a system for controlling abrasive wear of a sliding member in contact with a barcode formed in a component. The system includes a metallic base material and a barcode formed on the base material. The barcode may include a series of lines formed of markings. The markings may form a first row and a second row, with the first row being adjacent to the second row. The markings may also form a first column and a second column, with the first column being adjacent to the second column. A sliding member may be in direct contact with the metallic component and configured to contact the barcode.

DETAILED DESCRIPTION

Reference will now be made in detail to exemplary disclosed embodiments, which are illustrated in the accompanying drawings. Wherever possible, the same reference numbers will be used throughout the drawings to refer to the same or like parts.

Figure 1:
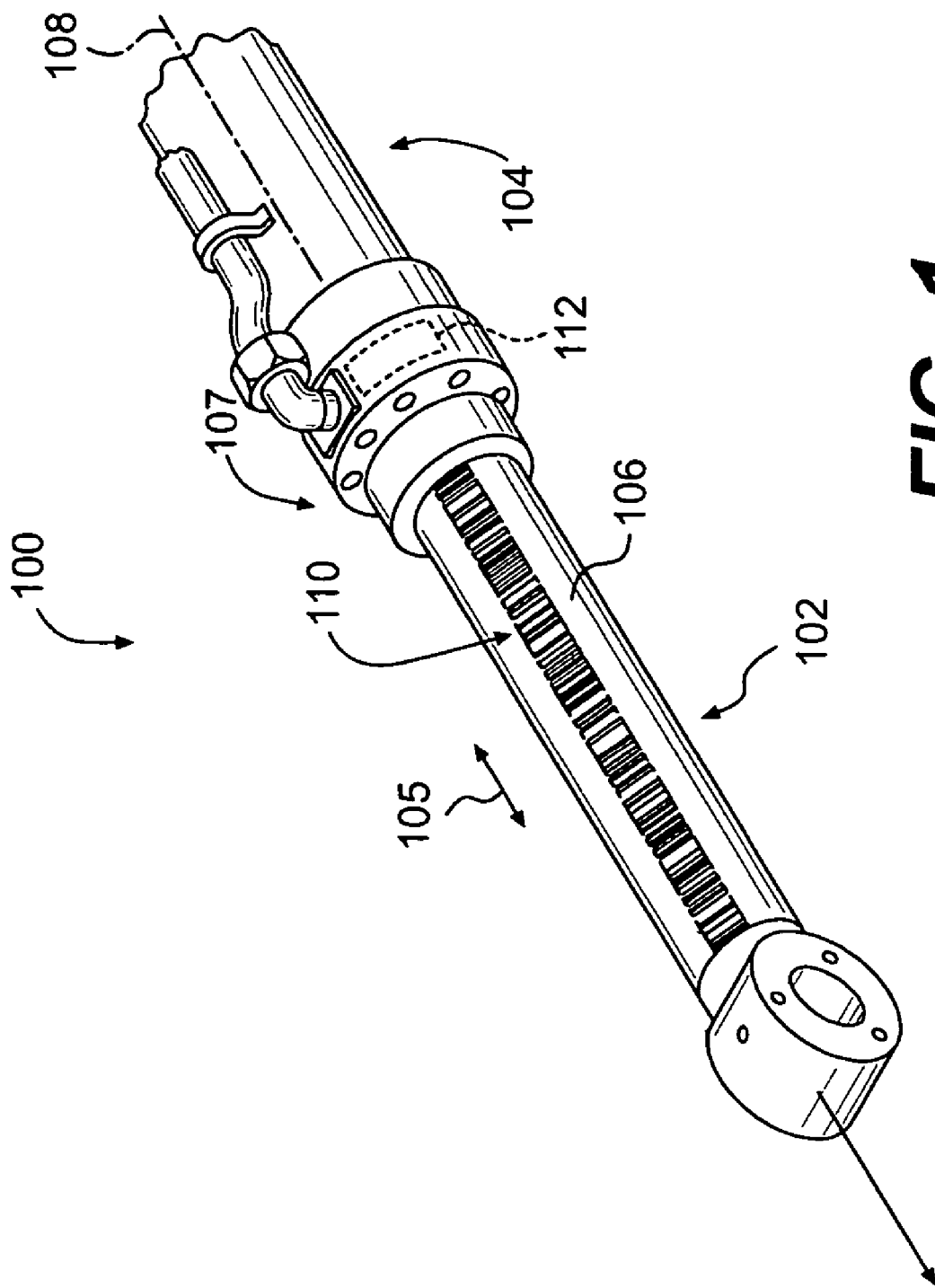
FIG. 1 is a diagrammatic illustration of an exemplary hydraulic cylinder.

FIG. 1 illustrates an exemplary embodiment of a cylinder 100. The cylinder 100 may include a rod 102 and a body 104. The cylinder 100 may be any one of a wide variety of hydraulic, pneumatic, and similarly actuated cylinders. The cylinder 100 may be operable to extend and retract the rod 102 into the cylinder body 104, typically along a linear path of movement represented by the arrow 105. In the exemplary embodiment shown, the cylinder 100 may be used as a hydraulic cylinder on a work machine, such as an earth moving machine, and the cylinder 100 may extend or retract to operate linkages and/or implements on the work machine.

The rod 102 may be housed within and be extendable relative to the body 104. The rod 102 may include a conventional coated or uncoated outer surface 106 and may define a longitudinal axis 108. In one exemplary embodiment, the rod 102 is a chrome coated rod, although other materials may be used to coat or form the rod 102. The cylinder body 104 may be a hollow body configured to house the cylinder rod 102 and also to receive fluid or other means for extending and retracting the cylinder rod 102 relative to the cylinder body 104. The cylinder body 104 may include a head 107 that may receive the rod 102.

In the embodiment shown, the rod 102 is movable while the cylinder body 104 is stationary. The present disclosure, however, is applicable to other rod and cylinder body configurations whereby the rod is stationary and the cylinder body is movable, as well as configurations in which both the rod and cylinder body are movable.

The rod 102 may include a barcode 1110 provided on the outer surface 106. The barcode 110 may be formed onto the cylinder rod 102 and may be used, along with a sensing system 112, to identify a position or extension amount of the cylinder rod 102.

The sensing system 112 may be associated with the cylinder body 104 for detecting the extension position of the rod 102. In the exemplary embodiment shown, the sensing system 112 may be housed within the body 104, and may be, for example, housed within the head 107. However, the sensing system 112 also may be disposed at locations other than the head 107, but may be disposed at any location allowing the sensing system 112 to read the barcode 110. The sensing system 112 may include, for example, one or more optical emitters, such as light emitting diodes (LEDs) and a sensor. The optical emitters may expose a portion of the outer surface 106 of the rod 102, including a subset of the barcode 110, to light, typically at infrared frequencies, although other frequencies of light may be used as well. The light reflects off or emanates from the exposed portion of the outer surface 106 and may be sensed by the sensor, typically including an array of photosensors.

Figure 2:
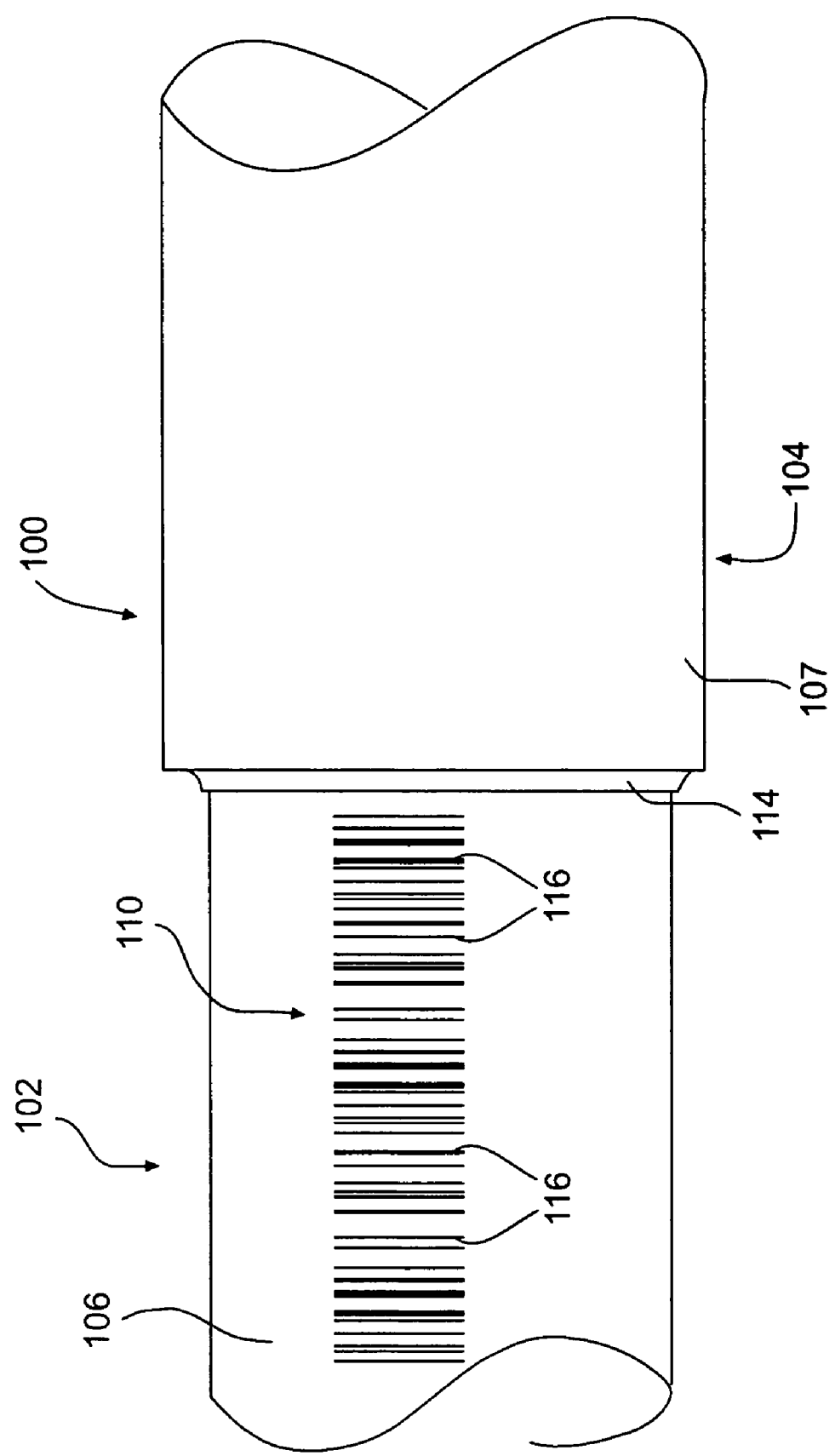
FIG. 2 is a diagrammatic illustration of a portion of the hydraulic cylinder of FIG. 1.

FIG. 2 shows a portion of the cylinder 100, where the rod 102 extends into the body 104. Between the body 104 and the rod 102, a cylinder seal 114 may be disposed that may be in direct sliding contact with the cylinder rod 102. The seal 114 may be configured to prevent dirt, oil, and debris that may be on the cylinder shaft 102 from entering the cylinder body 104. In addition, the cylinder seal 114 may be configured to maintain powering fluid, such as hydraulic or pneumatic fluid, within the cylinder body 104. In either case, the cylinder seal 114 may be in direct contact with an outer surface 106 of the cylinder rod 102. The cylinder seal 114 may be formed of an elastomeric material, a polymer material such as, for example, a thermoplastic material, or other suitable material.

Figure 3:
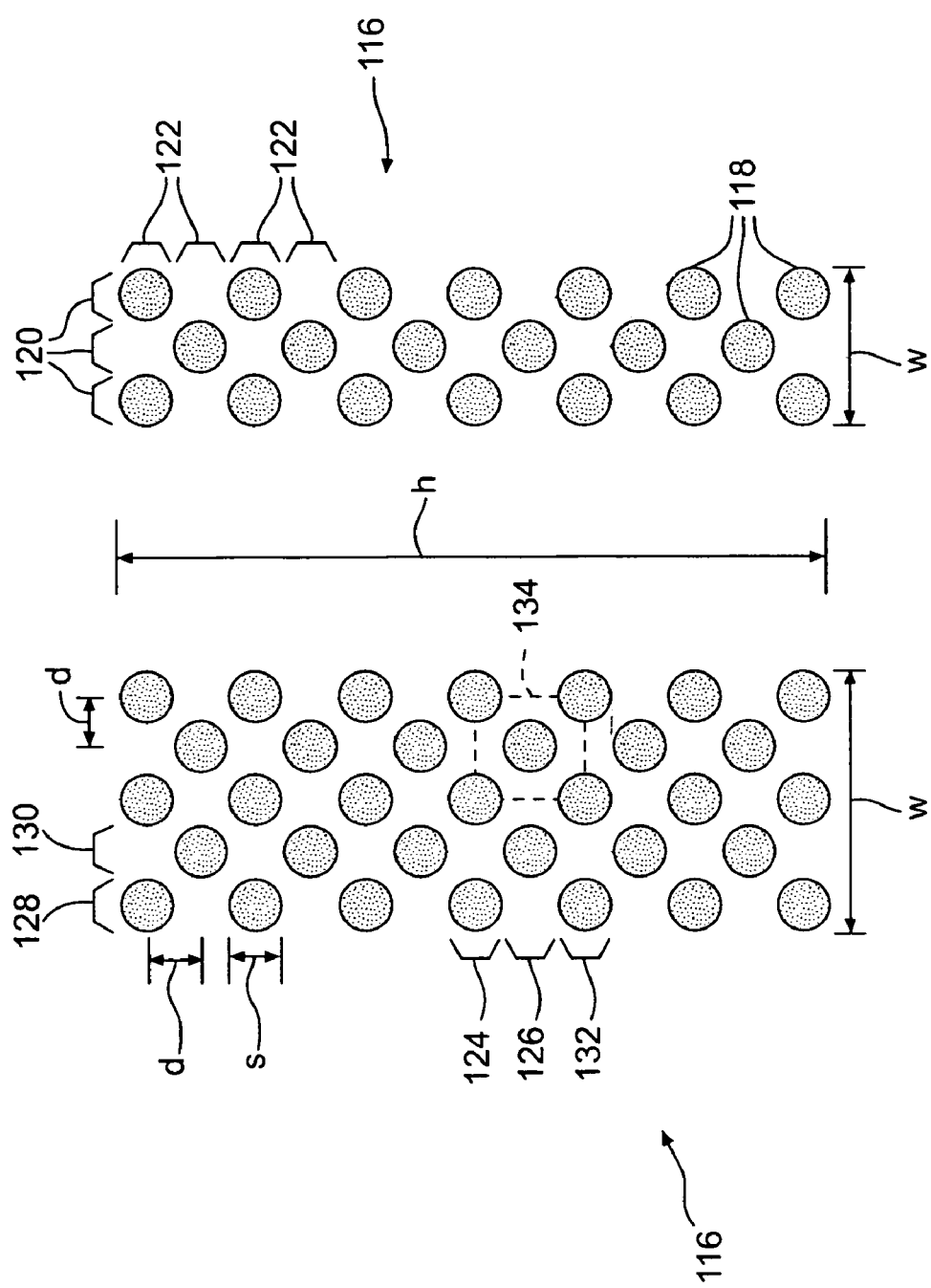
FIG. 3 is a pictorial representation of an enlarged portion of a barcode from FIG. 2.

As shown in FIG. 2, the barcode 110 is defined by a series of individual lines 116 extending along the rod 102. FIG. 3 shows an enlarged view of a portion of the individual lines 116 of the barcode 110. As shown in FIG. 3, the individual lines 116 of the barcode 110 may be formed of individual markings 118. It should be noted that in FIG. 3, for clarity, only a few representative markings are labeled with reference numerals.

In one exemplary embodiment, the individual markings 118 may be laser dots or laser markings formed using high frequency, high powered lasers. The lasers may vaporize material of the outer surface 106 in small spots to form shallow pits. When made small enough, the markings 118 may be placed in a tight honeycomb pattern that, when viewed optically, appear as a solid mark. Further, because of their size, the markings 118 may avoid the problem of peaks and valleys that arise when larger markings are made and therefore, may allow the lines 116 to slide past and contact a sliding material, such as the cylinder seal 114, with little or no additional wear. Accordingly, the life of the cylinder seal 114 may be extended.

In the exemplary embodiment shown in FIG. 3, each line 116 of the barcode 110 may have a width w and a height h. The width w of each line 116 may vary depending on the code defined by the lines 116. In the exemplary embodiment shown, the width w is less than the height h. The markings 118 may be formed to have a width across, referred to herein as a spanning distance s. In this embodiment, the markings 118 are round, and the spanning distance s is the diameter of the individual markings 118. However, the markings 118 need not be round, but may be formed to be another shape. For example, the markings 118 may be oval shaped, square, diamond shaped, or may be of some other suitable shape. In these embodiments, the spanning distance s is still the distance across the marking 118.

In the exemplary embodiment shown, the markings 118 of the lines 116 may form a series of columns 120 and a series of rows 122. In the exemplary embodiment shown, the rows 122 extend across the width w of the line 116 and the columns 120 extend across the height h of the line 116. In other embodiments, it should be noted that the rows could extend across the height h and the columns could extend across the width w. Again, for clarity, only a few representative rows and columns are labeled with reference numerals.

The series of rows 122 may include a first row 124 and an adjacent second row 126 of markings 118. As shown in FIG. 3, the first and second rows 124, 126 are established so that the markings 118 of the first row 124 are offset from the adjacent second row 126. Similarly, a first column 128 and an adjacent second column 130 of the series of columns 120 are established so that the markings of the first column 128 are offset from the adjacent second column 130. Because of this, in the exemplary embodiment shown, a marking 118 of the first row 124 may be part of the first column 128, but not a part of the second column 130. Likewise, a marking of the second row 126 may be a part of the second column 130, but not a part of the first column 128.

With reference to FIG. 3, a third row 132 of markings 118 may be disposed adjacent the second row 126. In the exemplary embodiment shown, two adjacent markings 118 in the first row 124 and two adjacent markings 118 in the third row 132 may together form a rectangular shape 134 which, in this case, is a square. A marking 118 from the second row 126 is disposed so that its center point is within the rectangular shape 134. It should be noted that the marking 118 of the second row 126 need not be centrally disposed within the rectangular shape 134, but may be off to one side or the other, so long as its center point is within the rectangular shape 134.

In the exemplary embodiment shown, the first and second rows 124, 126 are adjacent and are offset from each other by a distance d substantially equal to the spanning distance s of each marking 118. Likewise, adjacent first and second columns 128, 130 are offset from each other by the distance d. This allows the adjacent first and second rows 124, 126 to be placed close together and the adjacent first and second columns 128, 130 to be placed close together, without overlapping. It should be noted that the rows 120 and columns 122 may be offset by a distance d greater than or less than the spanning distance s. By being offset by a distance d equal to or less than the spanning distance s of the individual markings 118, linear gaps across the width w or across the height h may eliminated. Accordingly, a scanner of the sensing system 112 may be less inclined to mistakenly read the barcode 110 to include a linear space (or an empty bar) between adjacent rows 120 or adjacent columns 122 because there is no linear gap between the rows 120 and columns 122 themselves. Further, because each marking 118 is independently created and need not overlap with adjacent markings 118, the peaks and valleys created by melted material may be reduced and the life of any material sliding over the markings 118, such as the cylinder seal 114, may be prolonged. Although the system described herein does not include overlapped markings, it should be noted that in one exemplary embodiment, the offset markings 118 are still overlapped.

In one exemplary embodiment, each marking 118 may have a spanning distance s within the range of 1 to 30 micrometers. In another exemplary embodiment, the spanning distance s of each marking 118 may be within the range of 5 to 20 micrometers. In yet another exemplary embodiment, the spanning distance s may be within the range of 10 to 20 micrometers. Likewise, in one exemplary embodiment the markings 118 may be pits having a depth within a range of about 1 to 10 micrometers and, in another exemplary embodiment, the depth may be within the range of 1 to 5 micrometers.

INDUSTRIAL APPLICABILITY

The laser markings 118 forming the barcode 110 may reduce the formation of peaks and valleys that sometimes occur during a laser treating process. In addition, the laser markings 118, being offset, may ensure more reliable reading of the barcode 110 without overlapping the markings 118. Because the barcode 110 minimizes creation of peaks and valleys, extension of the rod with the barcode 110 past the cylinder seal 114 may not significantly wear the cylinder seal 114, providing a longer useful seal life. Further, because the markings 118 need not overlap, and because the markings 118 may be formed to be relatively small, the seal 114 may still effectively seal as the barcode 110 moves past.

In addition, because adjacent rows 122 are offset from each other, and because adjacent columns 120 are offset from each other, linear gaps between adjacent columns 120 and rows 122, across the width w or the height h of each line 116, may be minimized or eliminated. This occurs when the spacing between adjacent rows 122 and columns 120 is less than the spanning distance s of each individual marking 118. Such linear gaps frequently occur when the rows 122 and columns 120 are formed of markings that are not offset, but that are aligned. Further, offsetting the markings 118 of adjacent rows 122 and columns 120 reduces the need to overlap markings to form a consistent line of the barcode. Eliminating any overlapping may further reduce the formation of peaks that may occur during laser treatment of the outer surface 106.

One exemplary method of forming the barcode 110 will be described. The method may include forming the barcode 110 with a high frequency, high powered laser. To form the barcode 110, the laser may be used to create markings 118 on the outer surface 106 of a material, such as the cylinder rod 102. The markings 118 may be spaced apart from each other to reduce the incidence of overlapping and, in addition, may be formed in rows 122 and columns 120, with adjacent rows 122 and columns 120 being offset from each other.

In one embodiment, the markings may be formed in a manner that adjacent rows 122 of markings 118 may offset from each other by a distance d, which may be equal to or less than a spanning distance s of a single marking 118. By offsetting each row 122 and by offsetting each column 120, linear gaps between rows 122 and between columns 120 across the width w or height h may be reduced so that the sensing system 112 may more accurately read the barcode.

It should be understood that the markings 118 may be used to form a barcode 110 on any surface, including surfaces that are not cylinder rod surfaces. Further, the markings 118 may be formed on metallic surfaces, plastic surfaces, glass surfaces, or other surfaces, where it may be desirable to minimize peaks and valleys.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A barcode on a material, comprising:
   at least one line including a length and a width,
   wherein the at least one line is formed by markings on the material, the markings forming a first row and a second row, the first row being adjacent to the second row, the markings also forming a first column and a second column, the first column being adjacent to the second column, wherein the markings of the first row are offset from the markings of the second row, the markings have a spanning distance no greater than the distance between the first row and the second row.

2. The barcode of claim 1, wherein the rows extend along the width direction.

3. The barcode of claim 1, wherein the first column consists of markings of alternating rows.

4. The barcode of claim 1, further including a third row adjacent the second row, wherein two adjacent markings of the first row and two adjacent markings of the third row form a rectangle, and wherein at least one marking of the second row is disposed within the rectangle.

5. The barcode of claim 4, wherein the rectangle is a square and that the at least one marking of the second row is centrally disposed within the square.

6. The barcode of claim 1, wherein the markings are pits having a depth less than about 10 micrometers.

7. The barcode of claim 1, wherein the markings have a spanning distance less than about 20 micrometers.

8. The barcode of claim 1, wherein the markings have a spanning distance and wherein the distance between the first row and the second row is substantially equal to the spanning distance of the markings.

9. The barcode of claim 1, wherein the markings have a spanning distance and wherein the distance between the first row and the second row is less than the spanning distance of the markings.

10. A system for controlling abrasive wear of a sliding member in contact with a barcode formed in a component comprising:
    a metallic base material;
    a barcode formed on the base material, the barcode including a series of lines formed of markings, the markings forming a first row and a second row, the first row being adjacent to the second row, the markings forming the first row being offset from the markings forming the adjacent second row, the markings also forming a first column and a second column, the first column being adjacent to the second column, the markings forming the first column being offset from the markings forming the adjacent second column; and
    a sliding member in direct contact with the metallic component and configured to contact the barcode.

11. The system of claim 10, wherein the base material is a cylinder rod and the sliding member is a cylinder seal disposed about the cylinder rod.

12. The system of claim 10, wherein the markings of the first row are offset from the markings of the second row.

13. The system of claim 12, wherein the lines have a width and a height, the width being greater than the height, wherein the first and second rows extend along the width direction.

14. The system of claim 12, wherein the first column consists of markings of alternating rows.

15. The system of claim 12, further including a third row adjacent the second row, wherein two adjacent markings of the first row and two adjacent markings of the third row form a rectangle, and wherein at least one marking of the second row is disposed within the rectangle.

16. The system of claim 15, wherein the rectangle is a square and that the at least one marking of the second row is centrally disposed within the square.

17. The system of claim 12, wherein the markings have a spanning distance and wherein the distance between the first row and the second row is substantially equal to the spanning distance of the markings.

18. The system of claim 12, wherein the markings have a spanning distance and wherein the distance between the first row and the second row is less than the spanning distance of the markings.

19. An extendable cylinder, comprising:
a cylinder rod;
a cylinder body configured to house the cylinder rod, the cylinder rod being extendable relative to the cylinder body;
a barcode formed onto the outer surface of the rod, the barcode including at least one line that is formed of a series of individual markings; and
a cylinder seal in direct contact with the shaft and configured to seal about the shaft over the barcode, wherein the markings have a spanning distance and wherein the distance between the first row and the second row is substantially equal to the spanning distance of the markings.

20. The extendable cylinder of claim 19, wherein the at least one line includes a length and a width, with the length being greater than the width,
wherein the markings of the line form a first row and a second row extending along the width direction, the first row being adjacent to the second row, the markings also forming a first column and a second column extending along the height direction, the first column being adjacent to the second column, wherein the markings of the first row are offset from the markings of the second row and the markings of the first column are offset from the markings of the second column.

21. The extendable cylinder of claim 19, wherein the markings define a diameter and wherein the distance between the first row and the second row is less than the diameter of the markings.

22. The extendable cylinder of claim 19, including a sensing system configured to detect the barcode, the sensing system being disposed within a head of the cylinder body.

23. A method of forming a line of a bar code on a base material comprising: irradiating a surface of the base material with a laser to develop a first series of markings in a first row; and
irradiating a surface of the base material with a laser to develop a second series of markings in a second row, the second row being disposed adjacent the first row, wherein the markings of the second row are offset from the markings in the first rows, wherein the markings of the second row are offset from the markings in the first row by distance equal to or less than a spanning distance across the markings.

* * * * *

UNITED STATES PATENT AND TRADEMARK OFFICE
CERTIFICATE OF CORRECTION

PATENT NO. : 7,252,235 B2 Page 1 of 1
APPLICATION NO. : 11/012162
DATED : August 7, 2007
INVENTOR(S) : Kucher et al.

It is certified that error appears in the above-identified patent and that said Letters Patent is hereby corrected as shown below:

In Column 2, Line 58, delete "1110" and insert -- 110 --, therefor.

Signed and Sealed this

Fifteenth Day of July, 2008

JON W. DUDAS
*Director of the United States Patent and Trademark Office*